United States Patent [19]

Wisdom et al.

[11] 4,436,458

[45] Mar. 13, 1984

[54] LIQUID-SOLID CONTACTING APPARATUS

[75] Inventors: Lawrence W. Wisdom, Dallas; Gordon R. Wilson, DeSoto, both of Tex.

[73] Assignee: Frito-Lay, Inc., Dallas, Tex.

[21] Appl. No.: 452,329

[22] Filed: Dec. 22, 1982

Related U.S. Application Data

[63] Continuation of Ser. No. 972,404, Dec. 22, 1978, abandoned.

[51] Int. Cl.[3] .............................................. B65G 53/40

[52] U.S. Cl. .................................... 406/135; 222/410; 366/196; 366/316

[58] Field of Search ............... 406/108, 122, 135, 139, 406/191; 134/133, 134, 153; 222/369, 410; 366/194–196, 302, 307, 309, 315, 316, 317

[56] References Cited

U.S. PATENT DOCUMENTS

| | | | |
|---|---|---|---|
| 2,011,133 | 8/1935 | Toss | 406/135 X |
| 2,767,884 | 10/1956 | Gross | 222/410 X |
| 3,612,615 | 10/1971 | Allen | 406/108 X |
| 4,254,699 | 3/1981 | Skinner et al. | 366/307 X |

*Primary Examiner*—Jeffrey V. Nase
*Attorney, Agent, or Firm*—Bernard, Rothwell & Brown

[57] ABSTRACT

An apparatus for uniformly, downwardly moving in a vessel a compact bed of solid particles in contact with a liquid. Within the vessel there is provided a rotatable lower disc which has a radially extending opening for the passage of solids therethrough. The lower disc carries a member adjacent the opening for directing solids through the opening during rotation of the lower disc. This member preferably extends above the lower disc. A system is provided to maintain the liquid within the vessel while the solid particles pass out of the bottom portion of the vessel. A rotatable upper disc having a radially extending opening may be present to distribute solids charged to the vessel onto the upper surface of the bed of solid particles.

16 Claims, 6 Drawing Figures

LIQUID-SOLID CONTACTING APPARATUS

CROSS-REFERENCE TO RELATED APPLICATION

This application is a continuation of application Ser. No. 972,404 filed on Dec. 22, 1978, now abandoned.

BACKGROUND OF THE INVENTION

This invention relates to an apparatus for providing uniform contact of a downwardly moving, compact bed of particulate solids with a liquid which floods the bed. More particularly, the invention is concerned with an apparatus having means for insuring relatively uniform, gravity flow, often referred to as plug flow, of a compact bed of particulate solids through a vessel containing the solids in contact with a liquid which floods the bed to fill the interstices between the solids over a substantial height of the vessel. The apparatus is especially useful in contacting the solids with a liquid treating agent in order that the solids passing through the vessel have a relatively uniform residence time in contact with the liquid thereby insuring that given portions of the solids will not be treated for materially greater or lesser times than desired. As an example, the treatment of corn solids with an aqueous solution of calcium hyroxide can be accomplished in a continuous manner in the apparatus of the invention at relatively uniform residence times. Such treatment facilitates the further processing of the corn without having to unduly adjust subsequent treating operations as might be required if the products withdrawn from the treating vessel were not subjected to relatively uniform treatment with the liquid.

In many processes it is desired to contact particulate solids with liquids for a given period of time in order to accomplish a desired chemical or physical modification of the solids. When large amounts of solids are to be treated, it is most advantageous that they be disposed as a relatively compact bed in order to contain the solids in the smallest possible vessel and thereby save the considerable expense that the use of larger vessels would entail. In the compact bed it is desirable that there be little, if any, relative movement of the particles with respect to each other and, in the type of treatment involved, there is no need to provide agitation or intimate mixing of the liquid and solids since mere flooding of the bed with the treating liquid will suffice to accomplish the desired result.

These treatments of solids have most often been accomplished in the past merely by providing a number of soaking tanks in which the solids are placed and then flooded with the liquid treating agent. After a period of time, the tanks are emptied and the operation repeated. This type of batch operation requires a plurality of treating tanks, allotment of periods for loading and unloading, and excessive labor cost. It is more desirable to conduct the operation on a more continuous basis to reduce the vessel capacity required and lower operating expense.

One approach to a more continuous type of treatment is to feed the solids into the top of a treating vessel containing the treating liquid and remove treated solids from the bottom, and, in doing so, it is desired that the solids be disposed as a compact, downwardly moving bed in order to utilize a vessel of relatively small capacity for the amount of solids to be processed. Although appearing quite simple, difficulties in this operation do arise. In order to obtain a uniform length of contact between the solids and the treating liquid, any given solid particle should have approximately equal residence time in the liquid. To accomplish this goal, the compact bed should move relatively uniformly, downwardly through the vessel across substantially the entire cross-section of the vessel. This type of flow has often been characterized as plug flow and indicates the substantial absence of flow channels through the bed wherein some particles move faster than in other portions of the bed.

The apparatus of the present invention provides for relatively uniform, downward movement by gravity of the compact bed of particulate solids through a treating vessel while in contact with a treating liquid which occupies or floods the vessel over a substantial portion of its height. The flooding liquid thus occupies the interstices between the solid particles which are in particle-to-particle contact substantially throughout the compact bed. Also, the movement of the bed through the vessel is sufficiently slow so that there is relatively little particle-to-particle movement or intermixing, and substantial channeling of particle flow through the bed is avoided. This operation is made possible by providing the vessel with especially designed means for controlling the flow of solids through or from the bed in the region of its lower portion. The vessel may also be provided with means to distribute the solids onto the top of the bed.

The invention is particularly useful in treating grains with a liquid which serves to facilitate dehulling. For example, solids such as whole corn grains can be contacted with an aqueous solution of lime at, for instance, temperatures of about 95° F. to 145° F. Suitable treating times include, for instance, about 6 to 16 hours or more.

The character and operation of the features of the present invention will become apparent from the description of embodiments of the invention as represented in the drawings in which like parts are designated by like reference numerals.

DETAILED DESCRIPTION OF THE PREFERRED EMBODIMENT

Figure 1:
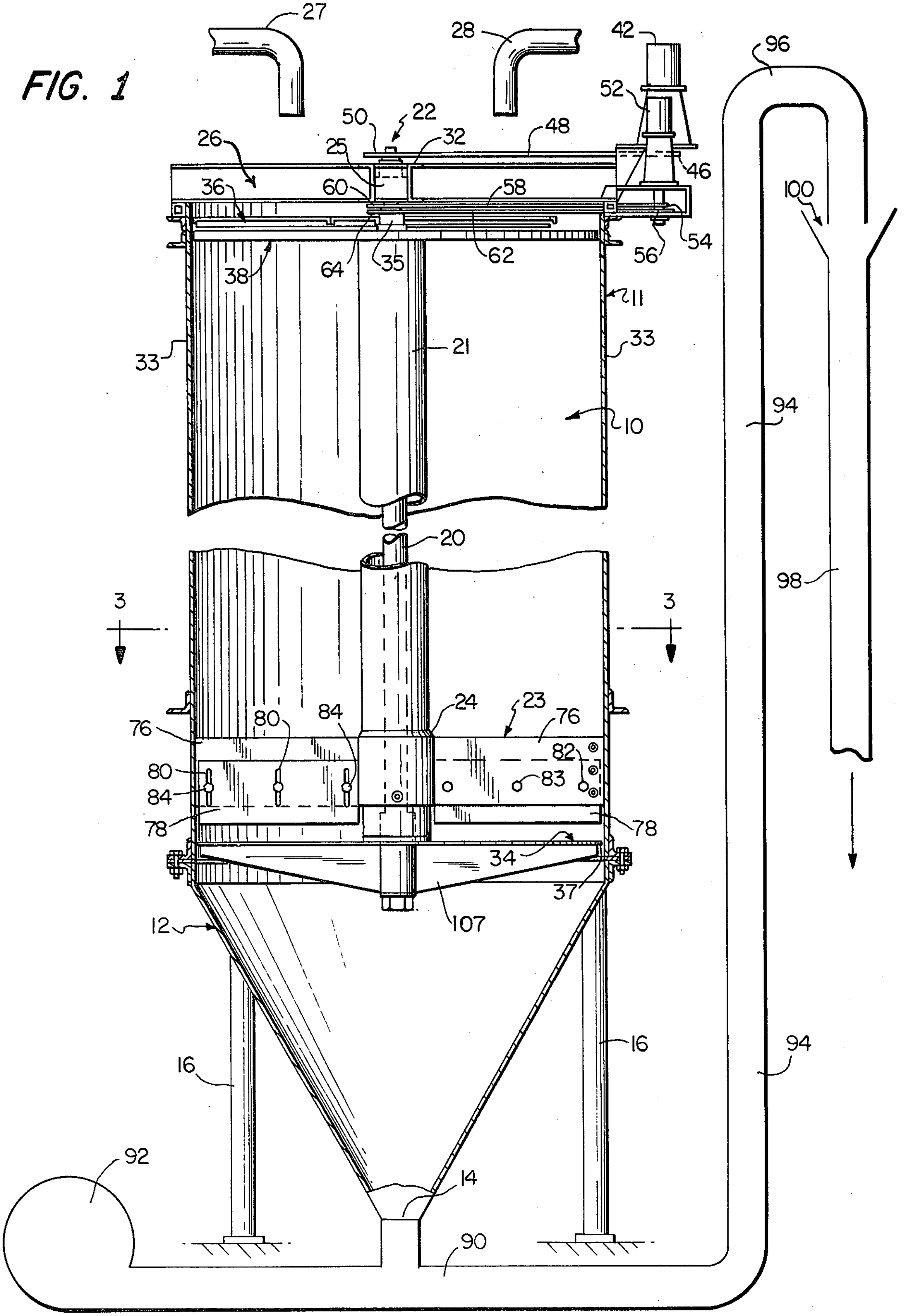
FIG. 1 is a cross-sectional, elevational view of a preferred embodiment of the liquid-solid contacting vessel of the invention.

Tank 10 is a generally vertically-positioned vessel for treating a compact bed of solid particles by contact with a flooding liquid. Preferably, tank 10 is a generally circular vessel having an open upper end in an upper body portion 11 and a conical, downwardly-extending bottom portion 12. A centrally-located outlet 14 is in bottom portion 12 for discharging the particulate solids which have passed through the vessel. As can be seen in FIG. 1, the tank is supported by members 16 on a floor or other suitable surface.

Centrally-located in tank 10 along its longitudinal axis, which in this case is also the vertical axis, is a generally vertical shaft 20 suitably journaled for rotation at its upper end in drive assembly 22. The lower end of shaft 20 is secured in hub 24 which is held in position adjacent to the bottom portion 12 by stabilizing arms 23. Shaft 20 extends substantially the entire length of the upper portion 11 of tank 10 and is positioned within a stationary casing 21 that serves to support arms 23. The upper portion of the casing 21 is secured to a bearing hub (not shown) within casing 21 and in which shaft 20 rotates. Bearing hub carries a bearing 25 in which the upper portion of the shaft 20 is rotatably secured. A support structure is provided for maintaining the bearing hub 32 in the desired position within tank 10. This structure includes web support struts 26 lying in a generally horizontal plane and fixedly secured between the bearing hub 32 and the side walls 33 of upper tank member 11. The lower end of casing 21 terminates at a position just above lower disc 34. The upper and lower ends of casing 21 are closed and sealingly engage the sides of the rotating shaft 20.

Corn is delivered to the top portion of the tank through a delivery pipe 27. Means are provided to spread the corn uniformly over the entire cross section of the tank after it is delivered from pipe 27. Fixedly mounted on central shaft 20 and generally horizontally disposed within tank 10 are five equally-spaced spreader arms 36 and an upper rotatable disc 38. The spreader arms 36 are mounted on hub 35 which is positioned immediately above the upper disc 38 that is generally horizontally-positioned in the upper portion of the tank above the compact bed of solid particles. The solid particles to be treated are deposited on the top surface of the upper disc 38 by the delivery pipe 27. Also provided is a pipe 28 for dispensing the liquid treating agent into the top of the vessel at a rate that will maintain the liquid level in the vessel so as to submerge at least a substantial portion, up to essentially all, of the compact bed of solid particles. The deposited solid particles are uniformly-distributed over the surface of the upper disc 38 by spreader arm 36 and subsequently deposited on the upper surface of the compact bed of solids located within the vessel beneath disc 38 by descending primarily through slot 40 of disc 38.

As depicted in FIG. 1, a power source such as an electric motor 42 is mounted on tank wall member 33 so as to drive sprocket 46. Drive chain 48 couples sprocket 46 and sprocket 50 that is fixedly mounted on central shaft 20 which rotates lower disc 34 that is fixedly mounted on shaft 20. A second power source such as an electric motor 52 with sprockets 54 and 56, is also mounted on tank member 33. Drive chain 58 couples sprocket 54 and sprocket 60 which is located in drive assembly 22 and thereby drives upper rotating disc 38 through a shaft 61 on which the disc is mounted and which is rotatably mounted around shaft 20 and inside bearing hub 35. Similarly, drive chain 62 couples sprocket 56 with sprocket 64 which is located in drive assembly 22 and drives hub 35 and spreader arms 36. As indicated, hub 35 to which the spreader arms are attached and the upper rotating disc are rotatably mounted on central shaft 20. However, both upper rotating disc 38 and spreader arms 36 are preferably mounted on shaft 20 by a bearing system of suitable design located, for instance, in drive mechanism 22 so as to provide for their rotation independent of the rotation of central shaft 20. Spreader arms 36 and the upper disc 38 should not rotate at the same speed if they are moving in the same direction, otherwise, the solid particles may not be spread evenly over the top surface of the upper disc. By spreading the particles over the upper disc a fairly constant amount can continuously pass through the disc, slot 40 and thereby form a compact bed with a relatively smooth, generally horizontally disposed upper surface. As depicted in FIG. 1, sprocket 56 is larger than sprocket 54 and sprockets 60 and 64 are approximately the same size. Thus, as sprockets 54 and 56 are rotated by power source 52, spreader arms 36 which are coupled to sprocket 56 will rotate more rapidly than upper disc 38 which is coupled to sprocket 54. Spreader arms 36 may rotate at about 320 rotations per hour (rph), upper rotating disc 38 at about 180 rph, and lower rotating disc 34 at about 7 rph. Alternatively, the spreader arms and the upper disc may be rotated in opposite directions. This may be accomplished by providing a third independent power source to which sprocket 56 would be operatively associated; sprocket 64 would then remain associated with second power source 52, as previously described.

Figure 2:
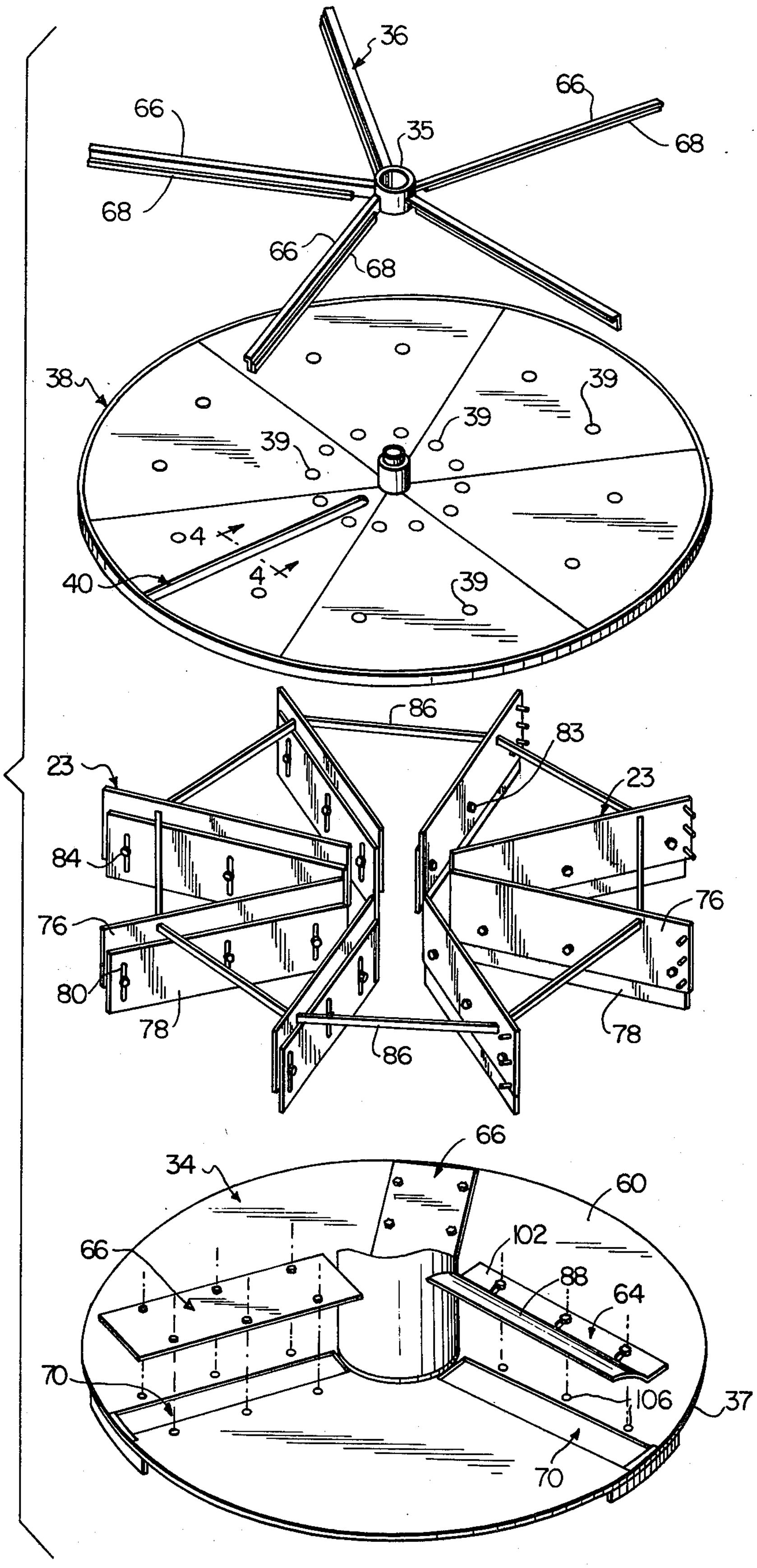
FIG. 2 is an exploded view of some of the elements shown in FIG. 1.

FIG. 2 shows the detail of an embodiment of the one or more spreader arms 36 which are generally horizontally-disposed and project radially outward from the hub 35 and extend substantially along the entire radius of the vessel. Typically, a plurality, e.g. five, of such spread arms may be attached approximately equally-spaced around hub 35. Advantageously, each spreader arm should extend outwardly and terminate just short of the inside wall of tank wall member 33, in order to maximize the rotational operation efficiency. That is to say, the spreader arms 36 most advantageously smooth the upper surface of the solid particles deposited on disc 38 over as much of the upper cross-sectional area of the disc as is practical.

As illustrated in FIG. 2, each spreader arm 36 is preferably made of two pieces, i.e., the principal support bar 66 and a blade 68. Blade 68 is preferably made of neoprene or some other non-corrosive, lightweight, flexible material. When blade 68 is bolted or otherwise clamped to the support bar 66, it may extend downwardly and generally perpendicularly toward upper rotating disc 38. As the spreader arms rotate, the blade evenly spreads the solid particles which have been deposited on upper rotating disc 38, to form a generally flat, horizontal surface of solids. Blade 68 can be made of a lightweight flexible material so as to pass over the surface of the upper disc at a position only slightly thereabove, and yield to irregularities in the surface of upper disc 38 with which the blades may contact.

Figure 4:
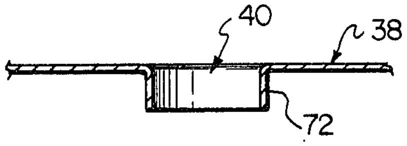
FIG. 4 is a cross-sectional view taken along lines 4—4 of FIG. 2.

Upper rotation disc 38 is generally horizontally disposed, and usually extends over substantially the entire cross-sectional area of the vessel. Preferably, the upper rotating disc should come close to making contact with the inside wall of tank wall member 33 so as to minimize passage of solid particulates between the outer peripheral edge of the disc and the inner periphery of tank wall member 33. Upper disc 38 has one or more radially-disposed, elongated openings 40 extending along a substantial portion of the radius of the disc. Opening 40 generally extends over a major portion up to substantially the entire radius of disc 38, and such openings usually comprise a minor portion of the total cross-sectional area of tank 10. FIG. 4 illustrates a preferred form of opening 40 in which there is provided a flange member 72 extending downwardly around the periphery of the opening to add strength to the slotted area of the disc. As the upper disc rotates, a relatively constant amount of solid particles may pass through opening 40 to form a generally horizontally-disposed upper surface on the compact bed of solids therebelow. Preferably, upper disc 38 may have a plurality of small openings 39 at, for instance, more or less regularly spaced intervals which provide means for removing the upper disc from the vessel to facilitate cleaning and repair. Additonally, these openings allow the liquid charged to the vessel to flow more freely through the upper disc, thereby assuring that the compact bed is flooded with the liquid solution. For convenience in manufacturing, disc 38 may be fabricated of a single piece or a plurality of sections which are securely attached together.

The lower rotating disc 34 is secured on the lower portion of the shaft 20 for rotation therewith. Disc 34 has an outer peripheral surface 37 which is substantially co-extensive with, but spaced slightly away from, the inner side walls 33 of the upper portion 11 slightly above the intersection of the upper portion 11 and the lower portion 12. In this way, very little liquid and solids will escape through the interface between the peripheral portion 37 of the lower disc 34 and side wall 33. The compact bed of solids located between the upper and lower rotatable discs 38 and 34 and the solid particles deposited on the surface of the upper disc 38 by spreader arm 36 descend through slot 40 and are deposited on the upper surface of the compact bed of solids.

To control the flow of solids and liquids through the tank, one or more discharge openings 70 are provided in the lower rotating disc 34 and at least one has a flow direction member 64 associated therewith. As can be seen in FIG. 2 three equally-spaced discharge openings 70 are provided but with two of the openings being closed by flat covers 66. With this configuration, a much slower movement of solid particles through the tank will be obtained when compared to the flow if all three openings 70 were uncovered and equipped with a directing member 64.

During rotation of the lower disc 34 and movement of the solids through the opening 70, there may be a tendency depending, for instance, on the depth of the bed of particles, for the bed to rotate with lower disc 34. To alleviate this undesirable movement, stabilizing arms 23 are rigidly secured between the hub 24 on casing 21 and wall 33 of tank body 11. In this preferred embodiment, eight of such stabilizing members are provided with each having a rigid plate 76 and flexible extendable plate 78. Rigid plate 76 is fixed in a radial plane passing through the axis of the shaft 20. Similarly, the extension plate 78 lies in a plane parallel and adjacent to that of rigid portion 76 and is adjustable toward and away from rotating disc 34. In this preferred embodiment, adjustability is provided by slots 80 in extendable plate 80, each slot having its major axis parallel to shaft 20. Plates 76 of the stabilizing arms 23 have complementary holes 82 registering with the slots 80. In this way, the extension plate 78 can be located along the length of the slot 80 at the desired position relative to the upper surface of the lower rotating disc 34 and secured to the upper plate 76 through the use of bolts 83 passing through the slot 80 and the complementary holes 82. Plate 78 can be secured to plate 76 by tightening nuts 84 on bolts 83.

To aid in maintaining the stabilizing arms in their secured position, cross bars 86 are provided between adjacent arms 23. Because of circular forces, substantial stresses may be imparted to stabilizing arms 23, and cross bars 86 provide support to absorb these forces.

Means are provided to control the movement of the solid particles through the openings 70 during rotation of disc 34. In this preferred embodiment, this means includes a flow directing member 64 secured to the upper surface 60 of the lower disc 34 adjacent slot 70. Member 64 extends upwardly from upper surface 60 and has a curved portion 88 extending over slot 70 in the direction of rotation of disc 34. In this way, member 64 moves through the solid particles, the particles are engaged by the inner surface of the curved portion 88 to facilitate movement of the particles through slot 70 in a controlled amount.

The curved portion 88 of member 64 extends above the upper surface 60 of the lower disc 34, a distance suitable for the bite of portion 88 to represent the desired rate of flow of solid particles through slot 70, taking into account the speed of rotation of disc 34. In one embodiment this distance has approximated one inch. The disc, and thus member 64, can be rotated at a rate which allows any desired residence time for the corn as it moves through the vertical tank. In a preferred embodiment, the lower disc 34 is rotated at about 7 revolutions per hour such that 7 inches of corn is removed from the bed during each hour. Accordingly, with a 70-inch tall bed of solid particles. It will take about 10 hours for a given portion of corn to move entirely through the length of the bed. The lip configuration of curved portion 88 helps to insure the correct flow rate of the corn through the tank. As member 64 rotates through the corn, the curved portion 88, which generally substantially and preferably essentially completely over slot 70, engages a given amount of corn and forces it through slot opening 70 which extends substantially across the radius of lower disc member 34. The corn removed through the disc falls slowly through the liquid in the lower conical portion of tank 10.

Figure 5:
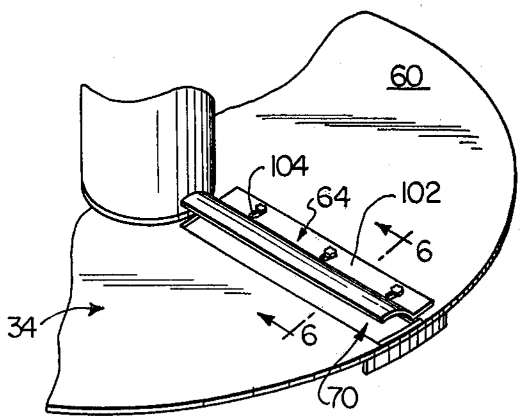
FIG. 5 is a fragmentary view of elements shown in FIG. 2.
Figure 6:
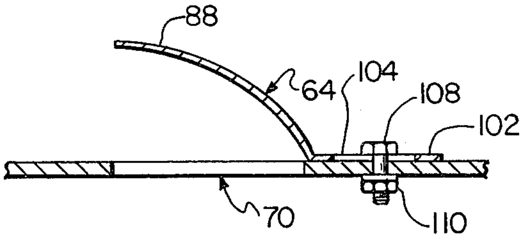
FIG. 6 is a cross section taken along lines 6—6 of FIG. 5.

As can be seen in FIGS. 2, 5, and 6, flow directing member 64 includes a rearwardly extending plate 102 having adjusting slots 104 therein registerable with complementary holes 106 in the upper surface of the lower rotating disc 34. With the use of bolt 108 and nuts 110, member 64 can be adjusted as desired with respect to the slot 70 by movement in a direction substantially perpendicular to the radius of the disc member 34 along which slot 70 lies to change the extent that curved portion overlies slot 70.

To facilitate versatility in arriving at a desired rate of movement of solids through tank 10, cover members 66, can be used to cover a desired number of openings 70. This configuration provides for an efficient way to change the flow rate of the solids through the liquid in the tank with minimum loss in time and effort.

In treating solids as they pass through the liquid, it is desirable to maintain substantially all of the liquid within the tank as the solids are discharged. For this purpose, the embodiment means of the invention shown in FIGS. 1 to 6 has means provided in communication with the bottom of the lower conical portion 12 of tank 10 to receive the falling corn passing through the lower disc 34 and convey it to a receiving tank for further disposition without discharging a substantial amount of liquid from tank 10. As can be seen in FIG. 1, this conveying means includes a lower horizontal pipe 90 having one end connected to pump 92 and the other end connected to a vertical pipe 94. The pump typically forces water through the horizontal pipe and upwardly through the vertical pipe. The corn falling through the conical portion 12 and outlet 14 is engaged by the moving water or other liquid and forced upwardly. The top of the vertical pipe has a U-shaped portion 96 which directs the corn into a downwardly-extending pipe portion 98 which ultimately is connected to a reservoir or other means for dispensing of the corn having passed through tank 10. It should be noted that the vertical pipe 94 is substantially the same height as the tank with the outlet end corresponding to liquid level in tank 10. This equalizes the liquid pressurehead in pipe 90 to that of the liquid in the tank. As a result, very little, if any, water or other liquid in the tank 10 passes out through the bottom conical portion with the corn. Rather, the liquid remains in the tank and any loss can be augmented by addition of the amount of make-up fluid needed to maintain a given level in tank 10 and thereby adequately treat the corn as it passes through tank 10 to the lower horizontal pipe 90. Vent 100 is provided at the intersection of the U-shaped portion 96 of the pipe and the downwardly-extending vertical pipe portion 98. This avoids any siphon effect which otherwise occur in this discharge system.

A return conduit can be connected between the reservoir which receives the water from the downwardly-extending pipe portion 98 and inlet of pump 92 such that the liquid used in the pump system can be continuously recycled. Otherwise, a large source of liquid would have to be made available which would normally increase the cost of using such a pump system. Of course, there wil be some nominal losses of liquid which occur in any system and can be made up.

The under surface of the rotating disc 34 is provided with a plurality of ribs 107 (FIG. 1.). As there is substantial load on the disc 34 during its operation, these ribs provide additional support for disc 34 to support the bed of solid particles as the disc rotates through a horizontal plane.

Figure 3:
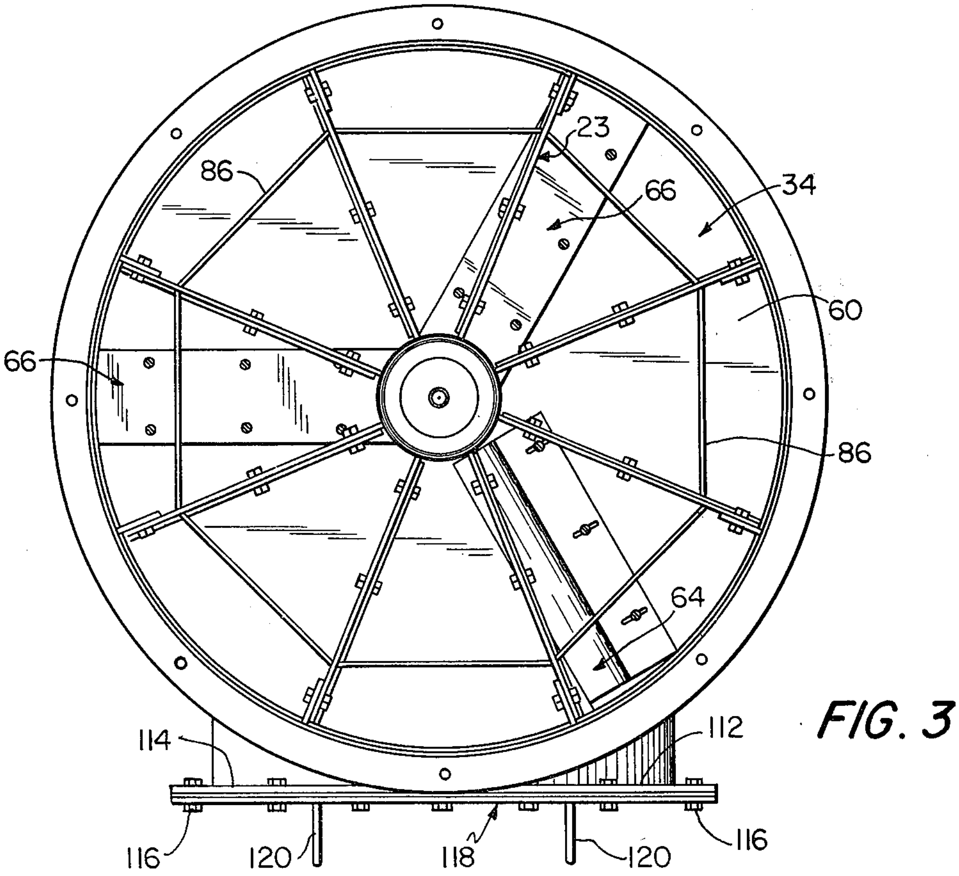
FIG. 3 is a cross-sectional view taken along lines 3—3 of FIG. 1.

Tank 10 also includes means to facilitate easy access to the internal portions of the tank for cleaning and maintenance purposes. As can be seen in FIG. 3, this means includes a rectangular opening 112 located approximately midway between the top and the bottom of said upper portion 11. An access flange 114 surrounds the opening 112 and defines a series of bolt holes to receive bolts 116 used in attaching a cover 118. A series of registerable bolt holes are provided along the periphery of cover 118 to register with those in flange 114 such that the bolts 116 can pass through the holes and turned down on a nut to secure the cover 118 in place. Handles 120 are provided on the exposed portion of the cover for allowing operators to hold the cover 118 in the correct position during assembly and disassembly procedures. With this configuration, access is obtained by removing the bolts in the typical fashion and pulling away the cover 118; in reassembly, the procedure is simply reversed.

With the above-described configuration, a tank for moving solid particulates therethrough at a given rate is accomplished in an efficient manner. Versatility is obtained through the adjustability provided in the stabilizing arms as well as the flow directing members associated with the rotating lower disc and the provision of cover members which readily can be added or withdrawn from the discharge openings.

There are several advantages which are achieved from the features of the above-discussed apparatus. For example, when the pumping rate is sufficient to remove all the solid particles at the same rate that they are being delivered to the lower portion of the tank, the accumulation of the solids in a manner which could adversely affect the flow through the tank is substantially avoided. In addition, this system insures that there will be no plugging of the openings in the lower disc and tank outlet which may otherwise result from such an accumulation. This is particularly advantageous when corn is used as the solid particles in an aqueous solution of calcium hydroxide because of the possibility of corn hulls being detached from the kernels. These detached hulls, if not withdrawn efficiently from the bottom of the tank can clog the apparatus and result in uneven flow of solids through the tank or even complete plugging. The pump system in conjunction with tank 10 avoids this problem. Furthermore, the adjustability feature of stabilizing arms 23 provides for adapting them to different size flow directing members 64. Thus, where a larger or smaller cut or bite by member 64 through the bed of solid particles is desired a member having the appropriate height is chosen and fixed to the lower disc 34, and the stabilizing arms are adjusted accordingly typically, to a position where a gap between an arm and the top of member 64 is at least as great as the effective diameter of the particles moving through the tank.

By using the apparatus of the invention to operate an essentially continuous solids-treating process, substantial savings in floor space are achieved when compared to the several tanks required of a batch system. Also, because of the uniformity which can be obtained by the above-described apparatus, a shorter soak time may be employed and still arrive at the desired result. Along with the shorter soak time, the advantages of the uniformity and continuity of this process include ease of control, the reduction in energies required for each cook cycle, a reduction of heat as a result of the elimination of the several tanks typically used in a batch process, and the reduction in labor costs which accompany the efficiencies associated with these advantages and operation of the invention.

Although the present invention has been described with reference to certain embodiments, alternations and rearrangement in the apparatus can be made, and still the result would be within the scope of the invention.

What is claimed is:

1. Apparatus suitable for providing movement of a bed of solid particles substantially uniformly therethrough in a downwardly direction in contact with liquid comprising:

(a) a generally vertically-disposed vessel for containing a compact bed of solid particles for contact with liquid;

(b) a rotatable, generally horizontally-disposed lower disc means extending substantially throughout the cross-sectional area of a lower portion of said bed for supporting said bed, said lower disc means having at least one opening for passage of solids therethrough from said bed, said opening extending substantially the entire radius of said bed area;

(c) means extending upwardly from said lower disc means and over said opening for substantially the entire length of said opening for controlling the passage of solid particles from said bed through said opening in said lower disc means for substantially uniform downward gravity flow of said solids in said vessel as a compact bed across substantially the entire cross-sectional area of the bed;

(d) means for rotating said lower disc means;

(e) means for discharging solid particles from the lower portion of said vessel while maintaining liquid in said vessel to a substantial height above said lower disc means;

(f) stabilizing means including a plurality of fixed, vertically-extending means in spaced-apart relationship in the lower portion of said bed above and adjacent said means (c) and extending across substantially the entire radius of said bed area for counteracting rotational movement across substantially the entire cross-sectional area of said bed by said lower disc means to permit solid particles to move downwardly in said vessel between said vertically-extending means; and (g) said stabilizing means further including an extendable portion adjustably secured to a fixed member, and said extendable portion being movable toward and away from said lower disc means.

2. The apparatus according to claim 1 wherein said fixed means includes a first plate member fixedly secured between the peripheral wall and axis of said vessel, said extendable portion includes a second plate member adjustably secured with respect to said first plate member and movable along a path parallel to the axis of said vessel.

3. The apparatus according to claim 1 further comprising means for distributing said solids generally uniformly over the upper part of said bed area.

4. The apparatus according to claim 3 wherein said means for distributing solids includes a rotatable, generally horiontally-disposed, upper disc means located substantially throughout the cross-sectional area of an upper portion of said vessel, said upper disc means having one or more openings for passage of solids therethrough.

5. The apparatus according to claim 1 in which said means (c) extending upwardly from said lower disc means is located adjacent said opening for directing said solid particles through said opening during rotation of said lower disc means.

6. The apparatus according to claim 5 wherein sid means extending upwardly from said lower disc means for controlling the passage of solid particles from said bed through said opening in said lower disc means is positioned on said lower disc means and has an upwardly extending portion with a surface that is concave relative to said opening in said lower disc means, said opening in said lower disc means having a first edge and a second edge extending radially in said lower disc means and said concave surface extends upwardly and over said opening in said lower disc means in the direction of rotation of said lower disc means.

7. The apparatus according to claim 6 comprising means for adjusting the extent to which said means associated with said lower disc means for controlling the passage of solid particles from said bed through said opening in said lower disc means extends over said opening in said lower disc means.

8. Apparatus suitable for providing movement of a bed of solid particles substantially uniformly therethrough in a downwardly direction in contact with liquid comprising:

(a) a generally vertically-disposed vessel for containing a compact bed of solid particles for contact with liquid;

(b) a rotatable, generally horizontally-disposed lower disc means extending substantially throughout the cross-sectional area of a lower portion of said bed for supporting said bed, said lower disc means having at least one opening for passage of solids therethrough from said bed;

(c) means extending outwardly from said lower disc means for controlling the passage of said particles from said bed through said opening in said lower disc means;

(d) means for rotating said lower disc means;

(e) stabilizing means for countering rotational movement of said bed across substantially its entire cross-sectional area, said stabilizing means being fixedly positioned above and in the vicinity of said means (c) and comprising one or more vertically-positioned plates extending across substantially the entire radius of said bed area;

(f) means for discharging solid particles from the lower portion of said vessel while maintaining liquid in said vessel to a substantial height above said lower disc means; and (g) said stabilizing means further including an extendable portion adjustably secured to said plates, and said extendable portion being movable toward and away from said lower disc means.

9. The apparatus according to claim 8 wherein said plates are in spaced-apart relationship in the lower portion of said bed and above said means (c) to permit solid particles to move downwardly in said vessel between said plates, wherein the vertical sides of said plates are essentially parallel to the axis of said vessel.

10. The apparatus according to claim 8 wherein said plates includes a first plate fixedly secured between the peripheral wall and axis of said vessel, said extendable portion includes a second plate adjustably secured with respect to said first plate and movable along a path parallel to the axis of said vessel.

11. The apparatus according to claim 8 wherein said means extending upwardly from said lower disc means for controlling the passage of solid particles from said bed through said opening in said lower disc means is positioned on said lower disc means and has an upwardly extending portion with a surface that is concave relative to said opening in said lower disc means, said opening in said lower disc means having a first edge and a second edge extending radially in said lower disc means, and said concave surface extending upwardly and over its said opening in said lower disc means in the direction of rotation of said lower disc means.

12. The apparatus according to claim 11 comprising means for adjusting the extent to which said means for controlling the passage of solid particles from said bed through said opening in said lower disc means extends over its said opening in said lower disc means.

13. Apparatus suitable for providing movement of a bed of solid particles substantially uniformly therethrough in a downwardly direction in contact with liquid comprising:

(a) a generally vertically-disposed vessel for containing a compact bed of solid particles for contact with liquid;

(b) a rotatable, generally horizontally-disposed lower disc means extending substantially throughout the cross-sectional area of a lower portion of the bed for supporting the bed, said lower disc means having at least one radially extending, slot-like opening for passing solids therethrough from the bed, said opening having a substantially uniform slot width throughout substantially the entire radius of the cross-sectional bed area;

(c) scoop means fastened on said lower disc means and extending upwardly and over the entire radial length of said slot-like opening for deflecting a substantially uniform thickness of the solid particle bed downward through said opening in said lower disc means during one revolution of said lower disc means;

(d) means for rotating said lower disc means;

(e) vertically oriented, plate-like baffle means fixedly mounted over said lower disc means and extending horizontally just above said lower disc means substantially the entire radial dimension of the bed for preventing rotation of the bed while permitting uniform downward movement of the bed; and (f) outlet means for discharging solid particles from the lower portion of said vessel below said lower disc means while maintaining liquid in said vessel at a substantial height above said lower disc means;

said baffle means further including an extendable portion which is adjustably secured so that said extendable portion is adjustable toward and away from the lower disc means.

14. The apparatus according to claim 13 wherein said scoop means has an upwardly extending portion with a surface that is concave relative to said opening in said lower disc means, said opening in said lower disc means having a first edge and a second edge extending radially in said lower disc means and said concave surface extending upwardly and over said opening in said lower disc means in the direction of rotation of said lower disc means.

15. The apparatus according to claim 14 comprising means for adjusting the extent to which said scoop means extends over said opening in said lower disc means.

16. The apparatus according to claim 14 wherein the baffle means includes a plurality of radially extending baffle plates, and means fixedly supporting said baffle plates at both inner and outer ends thereof.

* * * * *